United States Patent
Katsuyama et al.

(10) Patent No.: US 7,302,204 B2
(45) Date of Patent: *Nov. 27, 2007

(54) IMAGE FORMING APPARATUS

(75) Inventors: Goro Katsuyama, Yokohama (JP); Hideyuki Takemoto, Kawasaki (JP); Takuji Takahashi, Yokohama (JP); Makoto Kurata, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 462 days.

This patent is subject to a terminal disclaimer.

(21) Appl. No.: 10/731,151

(22) Filed: Dec. 10, 2003

(65) Prior Publication Data

US 2004/0114958 A1     Jun. 17, 2004

Related U.S. Application Data

(63) Continuation of application No. 10/102,967, filed on Mar. 22, 2002, now Pat. No. 6,690,901.

(30) Foreign Application Priority Data

Mar. 22, 2001 (JP) .............................. 2001-083807
Feb. 22, 2002 (JP) .............................. 2002-046670

(51) Int. Cl.
*G03G 15/00* (2006.01)

(52) U.S. Cl. ...................... 399/107; 399/405

(58) Field of Classification Search ............... 399/107, 399/365, 367, 377, 397, 405, 81; 347/138, 347/152

See application file for complete search history.

(56) References Cited

U.S. PATENT DOCUMENTS

| 5,200,781 | A | 4/1993 | Hata |
|---|---|---|---|
| 5,839,025 | A | 11/1998 | Okauchi et al. |
| 5,920,758 | A | 7/1999 | Ohtsuki |
| 5,991,570 | A | 11/1999 | Haga et al. |
| 6,263,185 | B1 | 7/2001 | Kato et al. |
| 6,272,297 | B1 | 8/2001 | Kobayashi |

(Continued)

FOREIGN PATENT DOCUMENTS

JP          5-197225          8/1993

(Continued)

*Primary Examiner*—Sandra L. Brase
(74) *Attorney, Agent, or Firm*—Oblon, Spivak, McClelland, Maier & Neustadt, P.C.

(57) ABSTRACT

An image forming apparatus including a main body housing, an image reading block for reading a manuscript image, and an image forming block located below the image reading block and for forming an image on a recording sheet. Also included is an operation block located at a front side part of the image reading block, and a sheet discharge space provided between the image reading block and the image forming block, and for receiving a discharge recording sheet having the image formed by the image forming block. The sheet discharge space is opened at least one side in a width-wise direction of the main body housing and at a front side so the at least one opened side communicates with the front side. Further, a front end portion of the image reading block is located above the sheet discharge space and is arranged at a position shifted toward a rear end side of the main body housing from a front outside wall surface of the main body housing.

26 Claims, 7 Drawing Sheets

U.S. PATENT DOCUMENTS

| | | | |
|---|---|---|---|
| 6,304,739 B1 | 10/2001 | Katsuyama et al. | |
| 6,438,339 B1 * | 8/2002 | Kaiho | .......... 399/405 X |
| 6,449,459 B2 | 9/2002 | Tamehira et al. | |
| 6,473,591 B2 | 10/2002 | Kominato | |

FOREIGN PATENT DOCUMENTS

| | | |
|---|---|---|
| JP | 8-339106 | 12/1996 |
| JP | 8-339107 | 12/1996 |
| JP | 11-43253 | 2/1999 |
| JP | 11-160941 | 6/1999 |
| JP | 11-212309 | 8/1999 |
| JP | 11-220559 | 8/1999 |
| JP | 11-327244 | 11/1999 |
| JP | 2000-221847 | 8/2000 |
| JP | 2001-13751 | 1/2001 |
| JP | 2001-154437 | 6/2001 |
| JP | 3230297 | 9/2001 |
| JP | 3574349 | 7/2004 |
| JP | 3580950 | 7/2004 |
| JP | 3595026 | 9/2004 |

* cited by examiner

IMAGE FORMING APPARATUS

BACKGROUND OF THE INVENTION

1. Field of the Invention

The present invention relates to an image forming apparatus including an operation block and an image reading block for reading a manuscript image. More particularly, the present invention relates to an image reading block having a front end portion shifted toward a rear side of a main body of the image forming apparatus.

2. Discussion of the Background

An image forming apparatus having the function of a copying machine, a printer, and a facsimile machine or at least two functions thereof is known. This type of image forming apparatus is also called an in-trunk sheet discharge type image forming apparatus. In this type image forming apparatus, a recording sheet on which an image is formed by an image forming block is discharged into a sheet discharge space between an image reading block and the image forming block.

Accordingly, as compared to an image forming apparatus in which a recording sheet is discharged onto a sheet discharge tray protruding from a main body of the image forming apparatus, the apparatus size as well as the installation space is reduced. In addition, because the sheet discharge space has an open front portion, the discharged recording sheet can be removed from the sheet discharge space through the open front portion. Further, in this type of image forming apparatus, the operator can operate the operation block with ease, because an operation block is located at the front side of the image reading block so as to be close to an operator.

Further, because a sheet discharge space is opened at at least one side in the width-wise direction and at a front part, a portion supporting the image reading block and operation block is relatively small. Accordingly, due to their own weights, the image reading block and the operation block tend to be bent downward. Further, when an operator operates the operation block located at a front side of the image reading block, the operator presses against the operation block, thereby giving a downward load to the operation block.

Due to such a downward load, the image reading block is also bent downward, especially after an elapse of time. If the image reading block is bent, a manuscript image cannot be correctly read by the image reading block. Thus, an image formed on a recording sheet by an image forming block is distorted. That is, a correct image cannot be reproduced. This image distortion is especially noticeable in a full color image.

Thus, an image forming apparatus having the configuration described above has an advantage in reducing the apparatus size and in improving an easiness in removing a recording sheet and in operating an operation block. However, the apparatus has a disadvantage in that the operation block and an image reading block are bend downwards.

SUMMARY OF THE INVENTION

Accordingly, one object of the present invention is to solve the above-noted and other problems.

Another object of the present invention is to prevent the operation block and image reading block from bending downwards with a simple configuration.

To achieve these and other objects, the present invention provides a novel image forming apparatus including a main body housing, an operation block, an image reading block for reading a manuscript image, and an image forming block for forming a record image on a recording sheet. The operation block is located at a front side part of the image reading block, and the image forming block is located below the image reading block. A sheet discharge space is also provided between the image reading block and the image forming block, and receives discharged recording sheets. The sheet discharge space is opened at at least one side in a width-wise direction of the main body housing and at a front side such that the opened side communicates with the front side. Further, a front end portion of the main body housing located above the sheet discharge space is arranged at a position shifted toward a rear side of the main body housing from a front outside wall surface of the main body housing portion.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Figure 1:
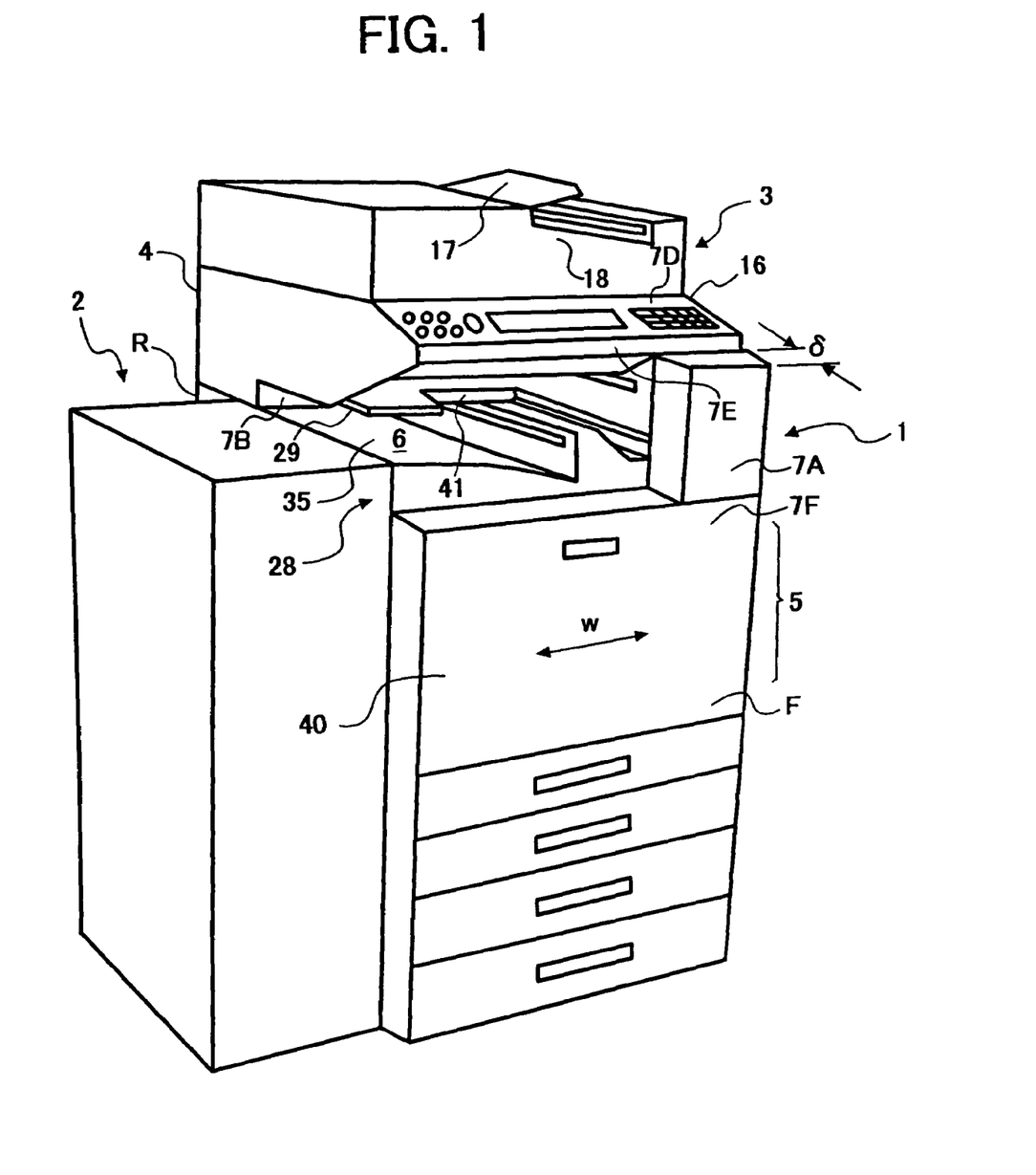
FIG. 1 is a perspective view of an image forming apparatus according to an embodiment of the present invention.
Figure 2:
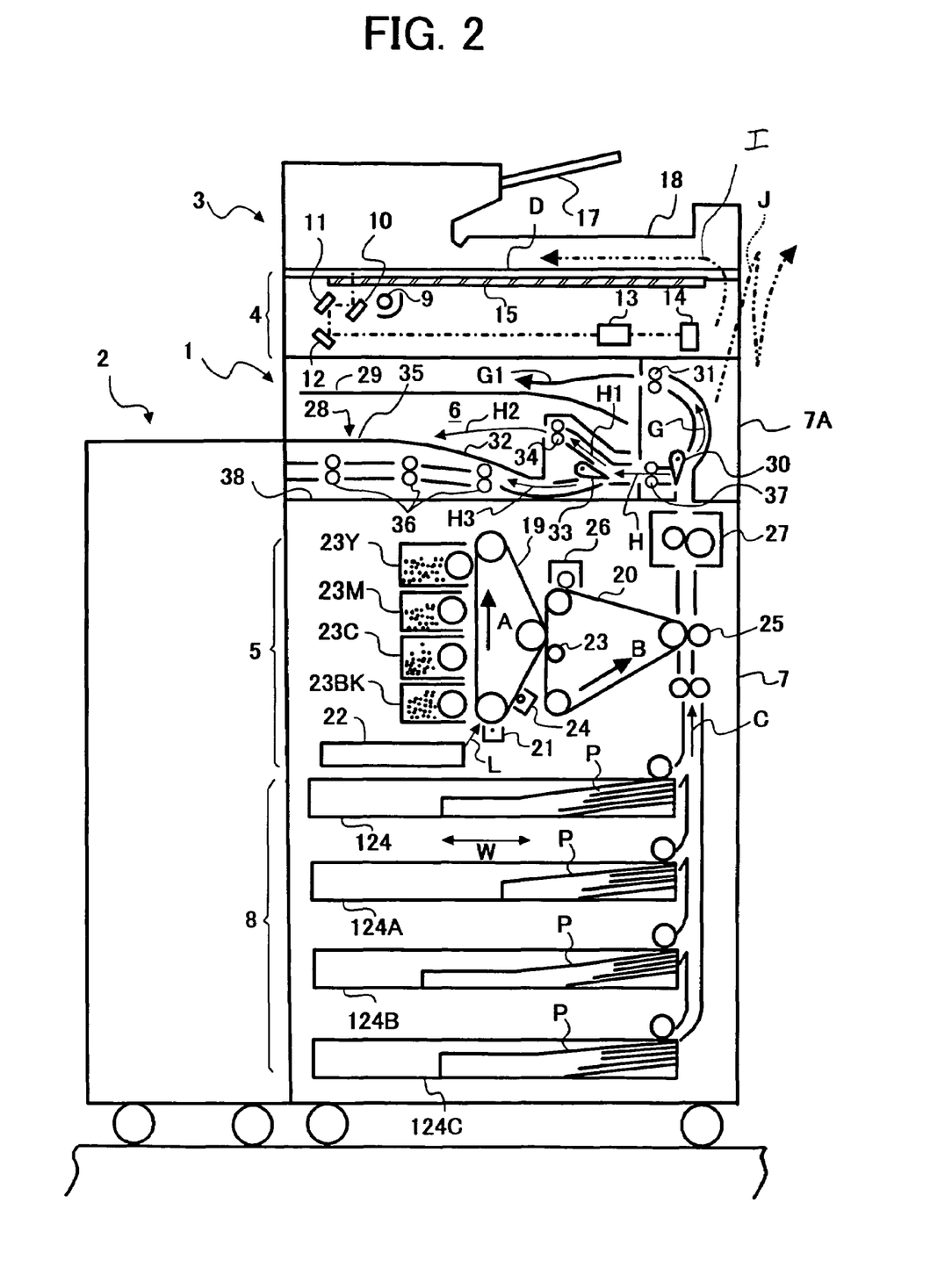
FIG. 2 is a cross sectional view of an image forming apparatus main body.
Figure 3:
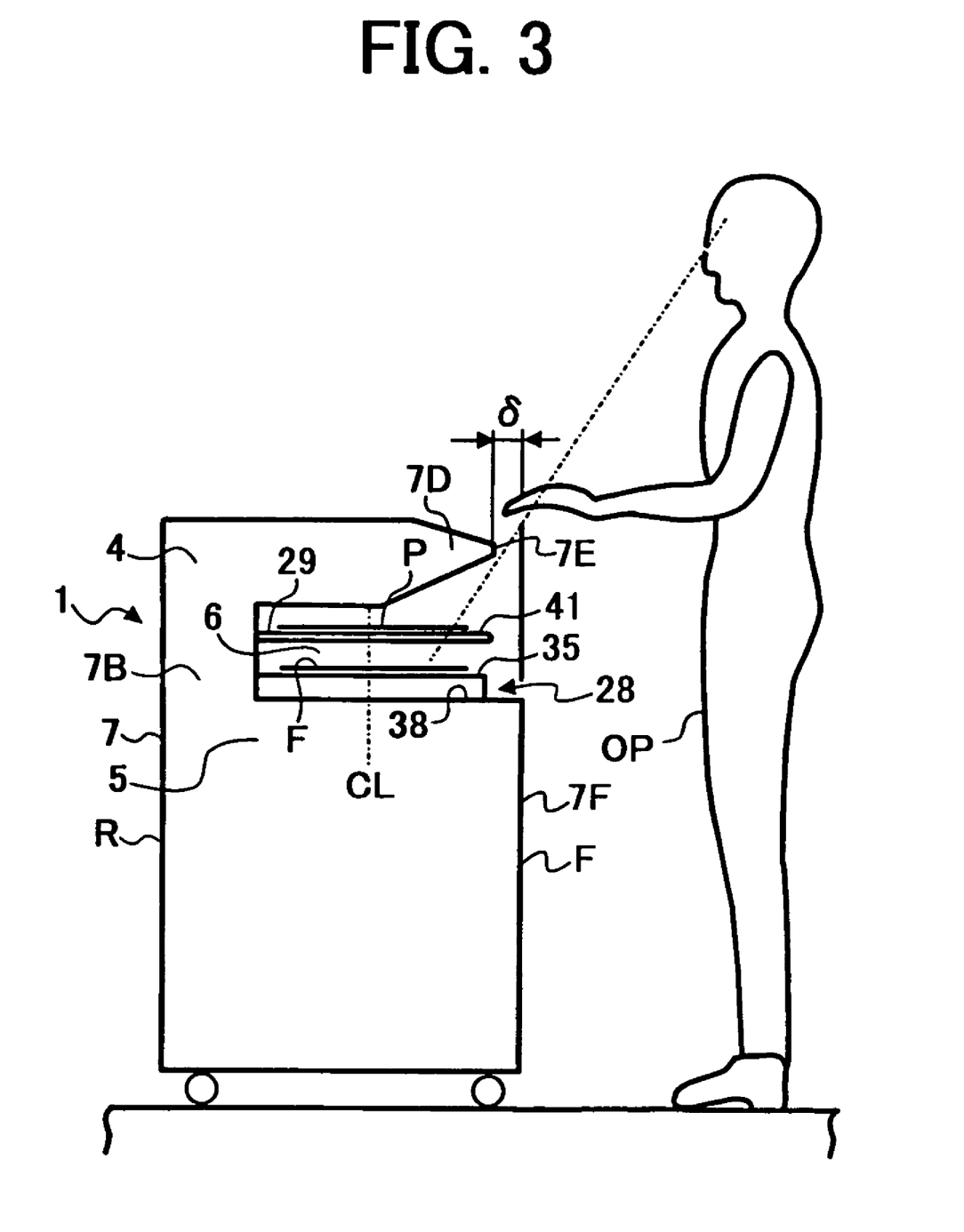
FIG. 3 is a schematic side view of the image forming apparatus main body viewed from the left side in FIG. 2, with a finisher and an automatic manuscript feed device removed.

FIG. 1 is a perspective view of an image forming apparatus according to an embodiment of the present invention. The image forming apparatus includes an image forming apparatus main body 1, a finisher connected to its side, and an automatic manuscript feed device 3 mounted on the image forming apparatus main body 1. FIG. 2 is a cross sectional view of the image forming apparatus main body 1. The finisher 2 and the automatic manuscript feed device 3 are optional. FIG. 3 is a schematic side view of the image forming apparatus main body 1 viewed from the left side in FIG. 2, with the finisher 2 and the automatic manuscript feed device 3 removed.

As illustrated in FIG. 3, the side of the image forming apparatus that faces an operator (OP) when the operator faces the image forming apparatus to operate the image forming apparatus is a front part (F) of the main body 1 or of a main body housing 7. A rear side part (R) of the image forming apparatus is opposite the front part (F). The direction perpendicular to a front-to-back direction (the direction from the front part F to the rear part R), that is, a left-to-right direction of the operator (P) facing the image forming apparatus is a width-wise direction (W) (FIG. 1, FIG. 2) of the main body 1 or main body housing 7.

The image forming apparatus of the present embodiment is a composite apparatus having a function of a copying machine, a printer, and a facsimile machine. The image forming apparatus main body 1 includes an operation block 16, and as will be described later, an image reading block 4 for reading a manuscript image. Also included is an image forming block 5 for forming an image on a recording sheet.

As shown, the operation block 16 is located at the front side of the image reading block 4, i.e., nearer to an operator facing the image forming apparatus for operating the apparatus. Further, the operation block 16 and a portion of the main body housing 7 of the image reading block 4 are integrally connected with each other. The image forming block 5 is located below the image reading block 4.

Additionally, the operation block 16 includes a print start key, a mode switching key, ten keys, etc., which are well known, so that an operator can operate the image forming apparatus by depressing each key. Further, a sheet discharge space 6 is provided between the image reading block 4 and the image forming block 5 (i.e., where a recording sheet having an image formed by the image forming block 5 is discharged, as will be detailed later). Moreover, a sheet supplying block 8 is provided at a lower part of the image forming apparatus main body 1 for supplying a recording sheet (P) to the image forming block 5.

As illustrated in FIGS. 1 and 3, the sheet discharge space 6 is opened at a front side and at a left side such that the front and left sides communicate with each other. Further, as shown, a support member such as a pillar is not provided at an open space of the sheet discharge space 6, for example, in FIG. 1, at a boundary portion between the front part and the left side part. Therefore, the open space is continuous. Thus, the operator can insert his/her hand into the sheet discharge space 6 through the openings at the front and left sides.

Moreover, in the image forming apparatus of the present embodiment, as will be described later, the sheet discharge space 6 may be also opened at the right side. Thus, the sheet discharge space 6 is opened such the sides in the width-wise direction of the main body housing 7 communicate with the front side.

As illustrated in FIG. 2, the image reading block 4 includes a light source 9, first to third mirrors 10, 11, 12, an imaging lens 13, and a CCD 14 as an example of a photo-electric conversion element. These components are arranged inside the portion of the main body housing 7 of the image reading block 4. In addition, a contact glass 15 is fixed on the portion of the main body housing 7 of the image reading block 4.

When the print start key of the operation block 16 is depressed, a manuscript set on a manuscript table 17 of the automatic manuscript feed device 3 is automatically fed onto the contact glass 15 to be placed thereon. The manuscript set on the contact glass 15 is denoted by a reference symbol (D) in FIG. 2.

The light source 9 and the first to third mirrors 10, 11, 12 are moved rightward in FIG. 2. The manuscript (D) is illuminated by light from the light source 9. Further, the light reflected by the manuscript (D) is reflected by the first to third mirrors 10, 11, 12, is passed through the imaging lens 13, and is transmitted to the CCD 14. Thus, a manuscript image is imaged at the CCD 14 and is photoelectrically converted.

The image reading block 4 of the image forming apparatus of the present embodiment also includes an optical system for imaging a manuscript image and a photoelectric conversion element for forming the manuscript image. In addition, the manuscript image is read by the image reading block 4, and then the manuscript (D) is automatically conveyed to a sheet discharge block 18 of the automatic manuscript feed device 3. When the automatic manuscript feed device 3 is not provided, a pressure plate is provided to press the manuscript (D) placed on the contact glass 15.

Additionally, as shown the image forming block 5 includes a belt-shaped photosensitive body 19 as an example of an image carrier, and other components explained below. These components are arranged inside a portion of the main body housing 7 of the image forming block 5.

In the image forming block 5, the photosensitive body 19 is spanned around a plurality of rollers and is driven to rotate in the direction indicated by the arrow (A). Similarly, an endless belt-shaped intermediate transfer body 20 spanned around a plurality of rollers is driven to rotate in the direction indicated by the arrow (B) while being in contact with the photosensitive body 19. When the photosensitive body 19 is rotated, a surface of the photosensitive body 19 is charged to a predetermined polarity by an electric charger 21 placed opposing the photosensitive body 19. A laser light (L) photo-electrically changed according to image information read by the image reading block 4 is emitted from a laser write unit 22, and the charged surface of the photosensitive body 19 is exposed by the laser light (L) to form an electrostatic latent image thereupon.

Also shown is a yellow developer 23Y, a magenta developing device 23M, a cyan developing device 23C, and a black developing device 23BK provided so as to oppose the photosensitive body 19. The developing devices 23Y, 23M, 23C, 23BK contain yellow toner, magenta toner, cyan toner, and black toner, respectively. Each of the developing devices 23Y, 23M, 23C, 23BK is supported by a drive device (not shown) to be at a development position in a vicinity of the outer periphery of the photosensitive body 19 and at a retreated position apart from the outer periphery of the photosensitive body 19.

The electrostatic latent image is made into a visible image by a first developing device occupying the development position, i.e., the yellow developing device 23Y in this example. At this moment, the other developing devices 23M, 23C, 23BK are each at a retreated position. Further, a yellow toner image formed on the photosensitive body 19 is transferred to the intermediate transfer body 20 by a first transfer roller 23 arranged at the rear side of the intermediate transfer body 20. Toner remaining on the outer periphery of the photosensitive body 19 after the toner image transfer is removed by a cleaning device 24.

Then, substantially in a similar way as described with references to first developing device, a second electrostatic latent image is formed, by the magenta developing device 23M at its development position, on the outer periphery of the photosensitive body 19 and is visible as a magenta toner image. The magenta toner image is transferred onto the yellow toner image on the surface of the intermediate transfer body 20.

In addition, the surface of the photosensitive body 19, after the toner image transfer, is cleaned by the cleaning device 24. Similarly, a cyan toner image and a black toner image are successively formed on the outer periphery of the photosensitive body 19 by the cyan developing device 23C and the black developing device 23BK, respectively and the toner images are transferred onto the toner images already transferred onto the surface of the intermediate transfer body 20.

Also, sheet feed cassettes 124, 124A, 124B and 124C of the sheet supplying block 8 contain recording sheets (P), such as, but not limited to, a transfer sheet and a resin sheet. The uppermost sheet in one of the cassettes 124, 124A, 124B, 124C is fed out in the direction of arrow (C). When this recording sheet (P) passes between the intermediate transfer body 20 and a secondary transfer roller 25, the toner images overlapped on the intermediate transfer body 20 are transferred simultaneously onto the recording sheet (P). After the toner image transfer, remaining toner attached to the surface of the intermediate transfer body 20 is removed by a cleaning device 26.

As described above, the image forming block 5 forms an image including toner images on the recording sheet (P). After the image is formed, the recording sheet (P) is conveyed upward to pass through a fixing device 27, where the toner image on the recording sheet (P) is fixed onto the recording sheet (P) by heat and pressure. After the image is formed, the recording sheet (P) is discharged into the sheet discharge space 6.

The exemplary description of the image forming apparatus functioning as a copying machine, with respect to its operation and configuration, is provided above. However, this image forming apparatus may also be used as a facsimile machine and a printer. Operations of the image forming apparatus when functioning as a facsimile machine and a printer are well-known in the art, and therefore explanations are omitted.

Here, various configurations can be conceivable for processing the recording sheet (P) discharged into the sheet discharge space 6. In the image forming apparatus, as illustrated in FIGS. 1 and 2, a relay unit 28 is detachably attached to the bottom of the sheet discharge space 6. A sheet discharge tray 29 is fixedly arranged in a part of the sheet discharge space 6 above the relay unit 28 for receiving the recording sheet (P). Moreover, at the side of the sheet discharge space 6, a main body housing portion 7A is positioned, in which a first switching claw 30 (see FIG. 2) for switching a direction of the recording sheet (P) coming out of the fixing device 27 is swingably supported.

When the first switching claw 30 is at the position illustrated in FIG. 2, the recording sheet (P) is guided by the first switching claw 30 and is conveyed upward in the direction indicated by the arrow (G). The recording sheet (P) is further guided by a first discharge roller pair 31 arranged in the main body housing portion 7A and is discharged and stacked onto a discharge tray 29 as illustrated by the arrow (G1).

When the first switching claw 30 is switched to another position, the recording sheet (P) coming out of the fixing device 27 is guided by the first switching claw 30 to be conveyed leftward as indicted by the arrow (H). The recording sheet (P) is introduced into a space inside of a cover 32 of the relay unit 28. Inside the cover 32, a second switching claw 33 is swingably supported. When the second switching claw 33 is at the position illustrated in FIG. 2, the recording sheet (P) is guided by the second switching claw 33 and is conveyed in the direction indicated by the arrow (H1). The recording sheet (P) is then discharged, by a second discharge roller pair 34 arranged inside the cover 32, and onto an upper wall surface 35 of the cover 32 as indicated by the arrow (H2). The upper wall surface 35 forms a stacking surface for the recording sheet (P) discharged into a space of the sheet discharge space 6 located above the upper wall surface 35.

As described above, in the image forming apparatus of the present embodiment, the recording sheet (P) may be discharged selectively into the two discharge portions in the sheet discharge space 6. For example, when the image forming apparatus is functioning as a facsimile machine, the recording sheet (P) may be discharged onto the discharge tray 29. Alternatively, when the image forming apparatus is functioning as a copying machine, the recording sheet (P) may be discharged onto the upper wall surface 35 of the relay unit 28, thereby improving operation of the image forming apparatus. Further, the recording sheet (P) which has been discharged into the sheet discharge space 6 may be removed through an opening at the front part thereof or through an opening at a side part thereof.

In addition, when the second switching claw 33 is switched to another position and the recording sheet (P) is conveyed in the direction indicated by the arrow (H3), the recording sheet (P) is conveyed by a plurality of convey roller pairs 36 located below the upper wall of the relay unit 28 and supported by the cover 32. The recording sheet is then discharged through a side opening of the sheet discharge space 6, and is fed into the finisher 2. The finisher 2 includes, for example, a stapler for stapling a bundle of recording sheets, a punching unit for punching the recording sheets, and a collator for collating the recording sheets. The recording sheets fed to the finisher 2 is subjected to a predetermined post-processing.

As described above, in the image forming apparatus of the present embodiment, a recording sheet is discharged from the main body housing portion 7A at one side, for example, the right end side in FIG. 2 in the width-wise direction and into the sheet discharge space 6. Further, the sheet discharge space 6 has an opening at the other end, for example, the left end side in FIG. 2 in the width-wise direction of the main body housing 7.

Moreover, at the bottom of the sheet discharge space 6, the relay unit 28 is detachably attached for conveying the recording sheet (P) discharged into the sheet discharge space 6 to the finisher 2 arranged adjacent to the image forming apparatus main body 1. The relay unit 28 has the upper wall surface 35 serving as a surface for stacking the recording sheet (P) discharged into the discharge space 6 above the upper wall surface 35.

As described above, when the relay unit 28 is provided at the bottom of the sheet discharge space 6, the recording sheet (P) coming out of the fixing device 27 may be conveyed to the finisher 2 in the shortest distance, thereby reducing the time required for feeding the recording sheet (P) to the finisher 2. Further, in image forming apparatus well-known in the art, a recording sheet coming out of a fixing device is conveyed, for example as indicated by a broken line arrow (I) in FIG. 2, and which is passed over an image reading block, to be fed to a finisher.

It is also well-known in the art that a recording sheet coming out a fixing device is discharged out of the image forming apparatus main body, for example as indicated by a broken line arrow (J) in FIG. 2, after which the recording sheet is reversed inside out by a reversing device and is conveyed to a finisher. However, in these known apparatuses, the convey path for conveying a recording sheet from the fixing device to the finisher is longer, resulting in a longer time required for conveying the recording sheet. This disadvantage is prevented by providing the relay unit 28 described above and illustrated in FIG. 2.

Further, the relay unit 28 includes the convey roller pair 36 and the second switching claw 33, and is used only in an image forming apparatus to which the finisher 2 is connected. That is, the relay unit 28 is not mounted on an image forming apparatus without the finisher 2. In this case, the recording sheet (P) conveyed in the direction of arrow (H) is discharged by a discharge roller pair 37 onto the bottom 38 of the sheet discharge space 6.

As described above, the relay unit 28 is mounted only when the finisher 2 is connected to the image forming apparatus and is detachably attached to the bottom of the sheet discharge space 6.

Further, in the image forming apparatus of the present embodiment, the image reading block 4 is supported with respect to the image forming block 5 only by the main body housing portion 7A at one side of the main body housing 7 in the width-wise direction and a main body housing portion 7B at the rear side. The sheet discharge space 6 is open at its front portion and at the other side (left side in FIG. 2) in the width-wise direction of the main body housing 7 such that openings at the front portion and at the other side communicate with each other.

Accordingly, when the relay unit 28 is mounted to the bottom of the sheet discharge space 6, the mounting operation of the relay unit 28 is relatively easy. Further, the relay unit 28 may be easily removed from the sheet discharge space 6.

Figure 4:
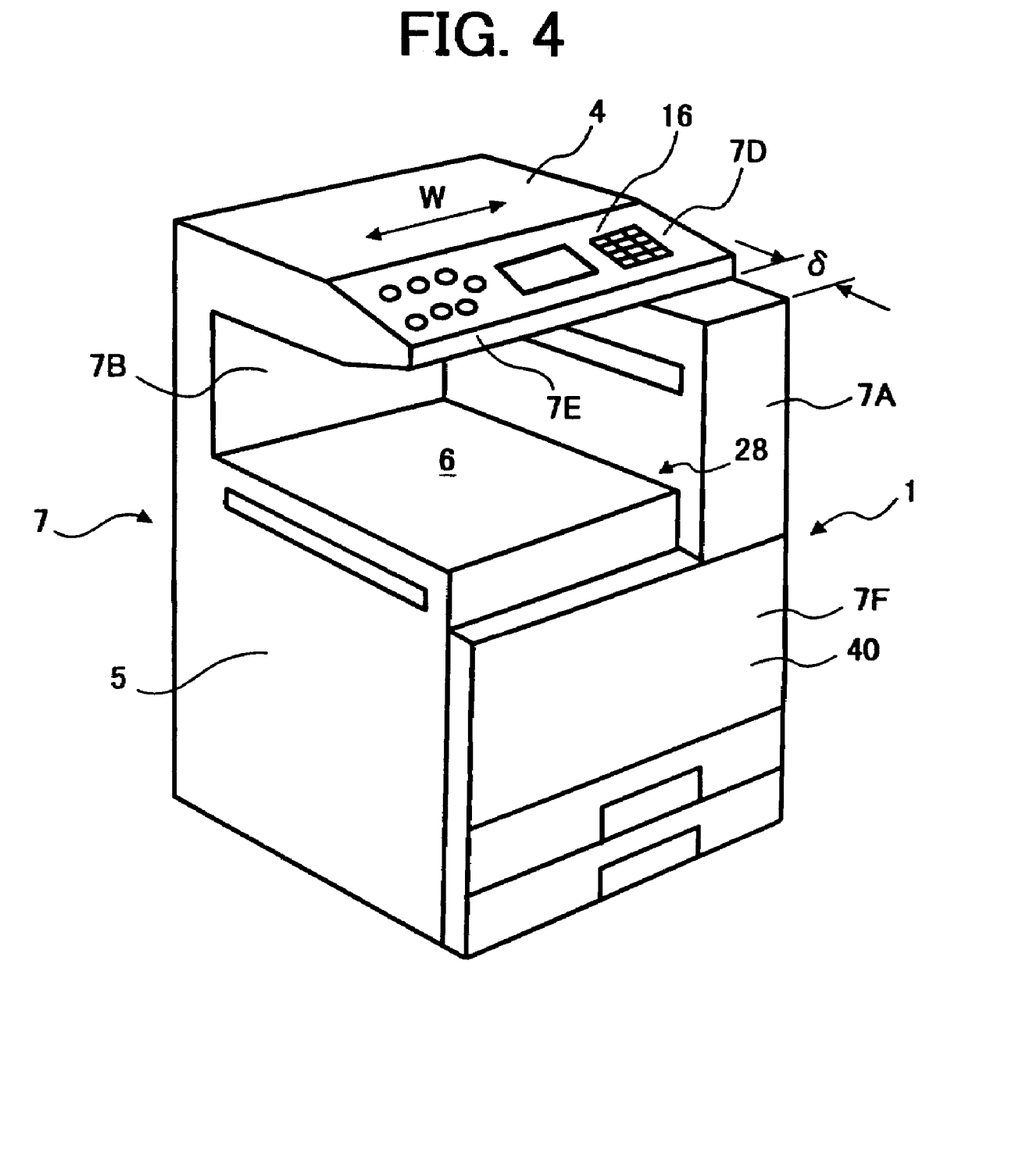
FIG. 4 is a perspective view of an image forming apparatus according to another embodiment of the present invention.

Furthermore, as illustrated in FIG. 4, the relay unit 28 may be formed as a unitary block with the main body housing 7 so as not to be detachable from the main body housing 7. However the relay unit 28 remains even when a finisher is not required, and thereby the sheet discharge space 6 is reduced by the space occupied by the relay unit 28. In the image forming apparatus illustrated in FIGS. 1 and 2, such a disadvantage is prevented.

In the image forming apparatuses according to the present invention described above, a recording sheet is discharged into the sheet discharge space 6 between the image reading block 4 and the image forming block 5, and the recording sheet may be removed through an opening of the sheet discharge space 6. Accordingly, the installation space of the image forming apparatus main body 1 is reduced.

Further, in the image forming apparatus according to the present invention described above, the sheet discharge space 6 is opened at a front part and a side part which communicate with each other. Further, the operation block 16 is provided at a front part of the image reading block 4. As described above, the image reading block 4 and the operation block 16 tend to bend downward, because the overall weight of the image reading block 4 and the operation block 16 is relatively large. Moreover, because an operator presses downward on the operation block 16, the image reading block 4 and the operation block 16 also bends downward. To prevent the image reading block 4 and the operation block 16 from bending, the construction of the image reading block 4 and the operation block 16 may be strengthened and a support mechanism may be made stronger. This, however, inevitably increases the cost of the image forming apparatus.

Accordingly, in the image forming apparatus of the present embodiment, as illustrated in FIGS. 1, 3 and 4, a front end portion 7E of the main body housing portion 7D of the main body housing 7, which is located above the sheet discharge space 6, is shifted by a distance δ toward a rear side of the main body housing 7 from a front outside wall surface 7F of the main body housing 7. In the example illustrated in FIG. 1, the front end portion 7E is arranged in a position shifted toward a rear side of the main body housing 7 beyond the front outside wall surface 7F of a front door 40.

In the above-described configuration, a bending momentum working on the main body housing portions of the operation block 16 and the image reading block 4 is relatively small, because a distance by which the operation block 16 and the image reading block 4 protrude from the main body housing portion 7B at the rear side of the main body housing 7 toward the front side thereof is relatively small. Thereby, with sufficient support of the operation block 16 and the image reading block 4, the operation block 16 and the image reading block 4 are prevented from bending downward. Thus, an image on a recording sheet recorded at the image forming block 5 is prevented from being distorted, and thereby the quality of the image is improved.

As explained above, in an image forming apparatus having a similar configuration, an operator standing in front of the image forming apparatus cannot easily observe a recording sheet discharged into a sheet discharge space. That is, because a sheet discharge space is located below an image reading block, a recording sheet discharged into the sheet discharge space is obstructed by the image reading block. Further, it is difficult to remove the recording sheet. If the height of the image forming apparatus is increased so the position of the sheet discharge space is nearer to the operator eyes, this problem may be solved.

However, if the height of the image forming apparatus is increased, the ease of operation is deteriorated. Thus, the entire height of the image forming apparatus is limited. In particular, for a color image forming apparatus for forming a full color image, the number of components forming the image forming block is relatively large, which increases the height of the image forming block, while the entire height of the image forming apparatus cannot be significantly increased so as to maintain an ease of operation. Accordingly, a height of the sheet discharge space needs to be reduced. However, this makes it harder to observe the recording sheet and to remove the recording sheet from the sheet discharge space.

In contrast, in the image forming apparatuses according to the present invention as shown in FIGS. 1–4, the front end portion 7E is shifted by the distance δ toward the rear side of the main body housing 7 from the front outside wall surface 7F. Therefore, as illustrated in FIG. 3, the operator standing in front of the image forming apparatus main body 1 may easily observe the recording sheet (P) discharged into the sheet discharge space 6, and may easily remove the recording sheet (P). Further, a cut-out portion 41, as shown in FIG. 1, at the front side of the sheet discharge tray 29 also improves visibility of the recording sheet (P) accumulated on the upper wall surface 35 of the relay unit 28 or on the bottom surface 38 when the relay unit 28 is not provided.

The shifting distance δ of the front end portion 7E toward the rear side of the main body housing 7 may be set at various values. However, experimental results indicated that the aforementioned effect may be assured when the front end portion 7E is shifted by at least 30 mm toward the rear side of the main body housing 7 from the front outside wall surface 7F.

Furthermore, as illustrated in FIG. 3, the front end portion 7E may be shifted toward the rear side of the main body housing 7 from the front outside wall 7F such that a vertical line (V) passing the front end portion 7E intersects a maximum-sized recording sheet (P) discharged into the sheet discharge space 6. Thereby, a maximum-sized recording sheet (P) that may be used in the image forming apparatus can be observed even from right above the image forming apparatus, further improving the visibility of the recording sheet in the sheet discharge apace 6.

In addition, the shifting distance δ may be set such that even when a smallest-sized recording sheet P that may be used in the image forming apparatus is used, the vertical line (V) intersects the smallest-sized recording sheet (P). By arranging the front end portion 7E as discussed above, the recording sheet (P) discharged into the sheet discharge space 6 may be observed for all sizes of the recording sheet (P), thereby increasing the visibility of the recording sheet (P) in the sheet discharge space 6. Further, setting the shifting distance δ relatively large such that the recording sheet (P) of the smallest size may be observed is not particularly easy. However, setting the shifting distance δ so the vertical line (V) intersects a recording sheet of the maximum size, for example, a recording sheet of A3 size, discharged into the sheet discharge space 6, may be easily realized.

Figure 5:
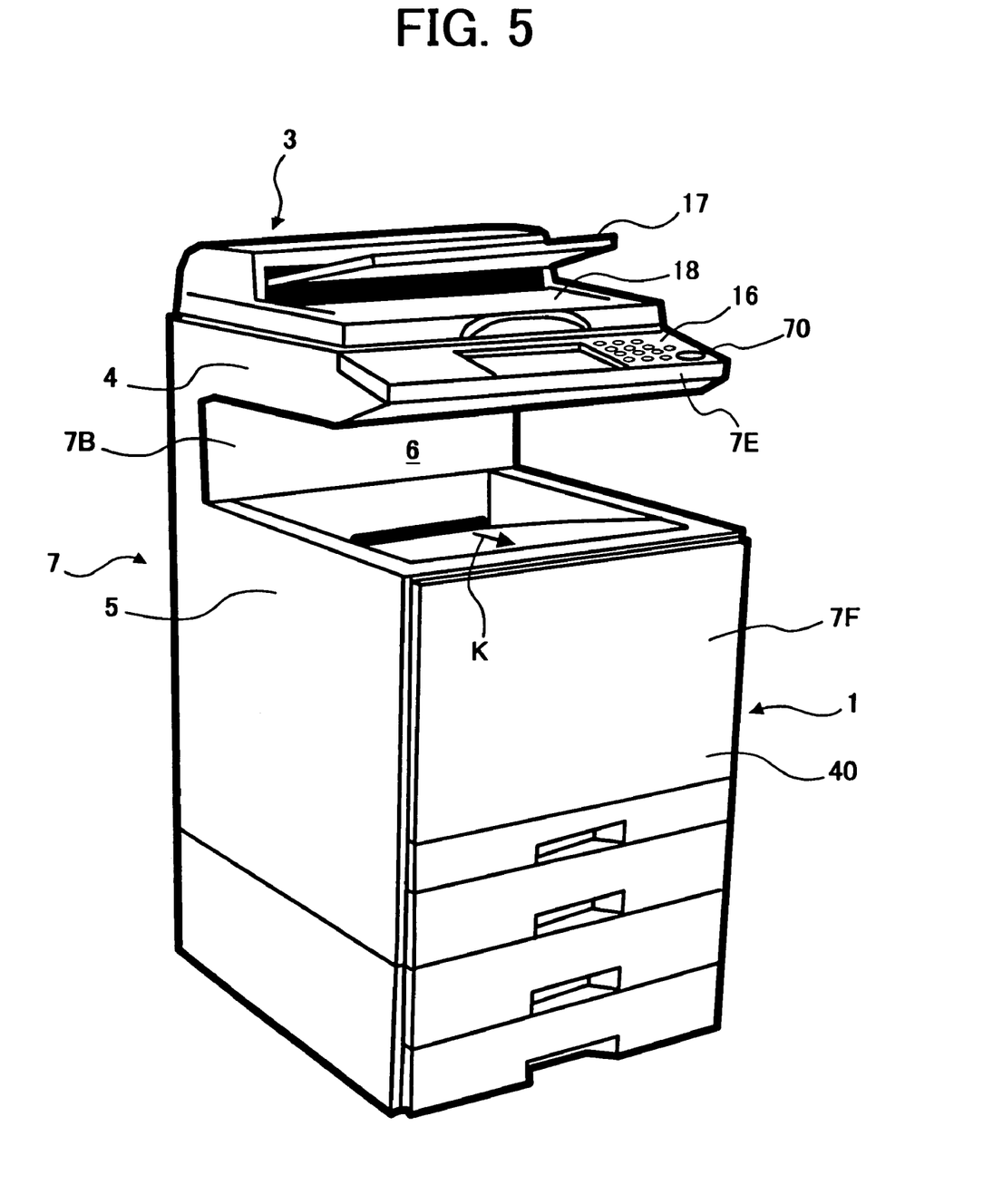
FIG. 5 is a perspective view of an image forming apparatus according to another embodiment of the present invention.
Figure 6:
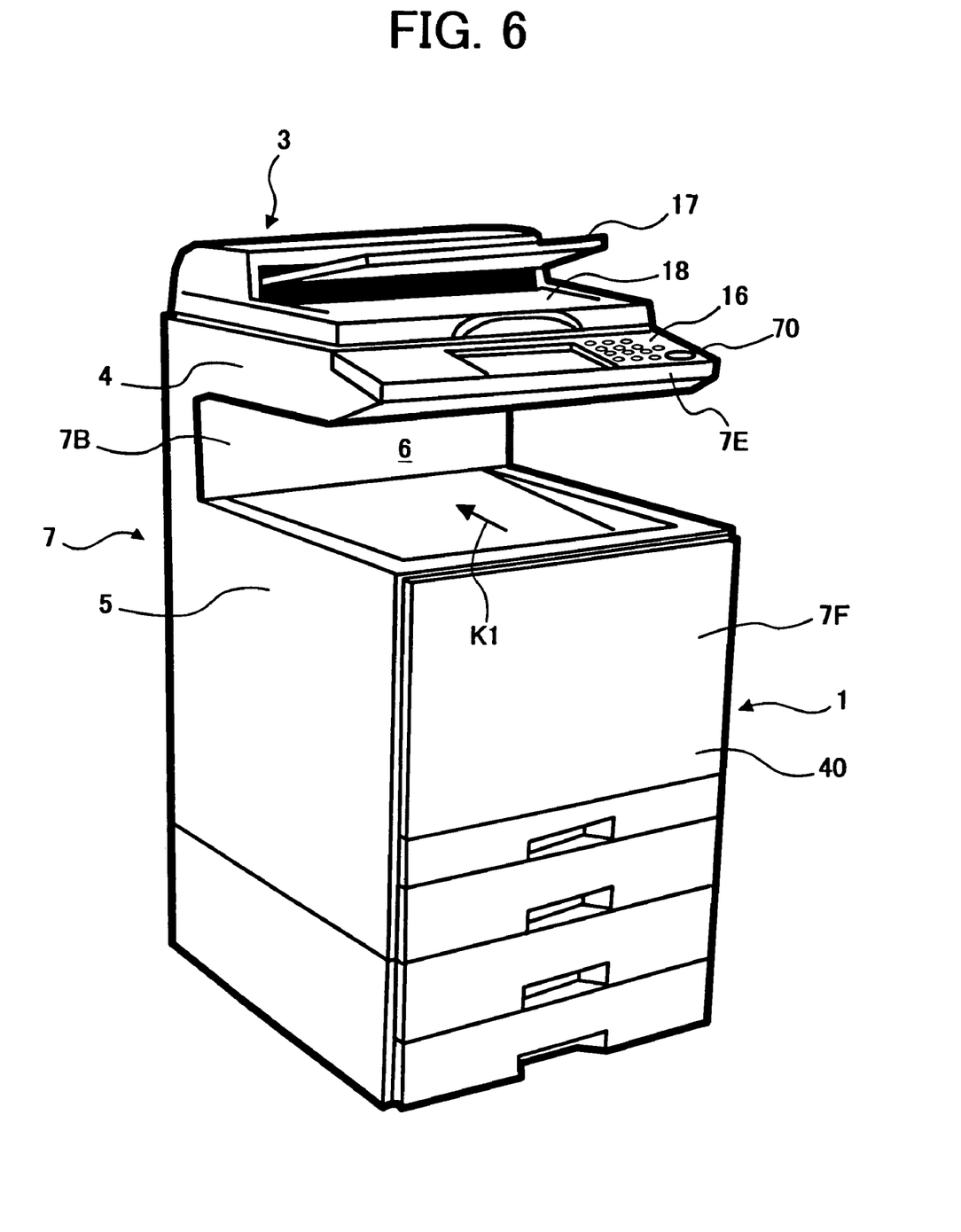
FIG. 6 is a perspective view of an image forming apparatus according to yet another embodiment of the present invention.

As illustrated in FIG. 5 and FIG. 6, an image forming apparatus includes the image reading block 4 which is supported with respect to the image forming block 5 only by the main body housing portion 7B at the rear side of the main body housing 7. In FIG. 5, a recording sheet is discharged into the sheet discharge space 6, as indicated by the arrow (K), from the main body housing portion 7B at the rear side of the main body housing 7. In the example of FIG. 6, a recording sheet is discharged into the sheet discharge space 6, as indicated by the arrow (K1), from a main body housing portion at the front side of the sheet discharge space 6. Each of the above-described configurations of the present invention may be applied to the image forming apparatuses of FIGS. 5 or 6.

In each of the image forming apparatuses illustrated in FIGS. 5 and 6, respectively, a recording sheet discharged into the sheet discharge space 6 may be observed from three directions and removed from the sheet discharging space 6 in the three directions. However, because the main body housing portions supporting the image reading block 4 is further reduced compared to the image forming apparatuses of FIGS. 1 and 2, the image reading block 4 tends to more easily bend downward. Accordingly, in such image forming apparatuses, shifting the front end portion 7E toward the rear side of the main body housing 7 more than the front outside wall surface 7F may be advantageously used.

Moreover, in the image forming apparatus of the present embodiment illustrated in FIGS. 1–4, described above, the recording sheet (P) is discharged from the main body housing portion 7A at one side in the width-wise direction of the main body housing 7 into the sheet discharge space 6. When the front end portion 7E is shifted about 55 mm from the front outside wall surface 7F toward the rear side of the main body housing 7 and the center position CL (shown in FIG. 3) vertically intersects the convey direction of the discharged recording sheet (P), the visibility of the recording sheet (P) in the sheet discharge space 6 is particularly increased. Further, the recording sheet (P) may be more easily removed from the sheet discharge space 6. Moreover, the inventors of the present invention have confirmed by experiments that the resulting bending moment on the image reading block 4 is reduced.

In addition, in the image forming apparatuses illustrated in FIGS. 1–4, the front outside wall surface 7F of the main body housing portion 7A protrudes from the front end portion 7E. By configuring the front outside wall surface 7F to protrude toward the front, the main body housing portion 7A may be made large so the rigidity of the main body housing portion 7A is increased. Further, because the image reading block 4 and the operation block 16 are supported by the main body housing portion 7A and thus increased in rigidity, the image reading block 4 and the operation block 16 are firmly supported and have an increased supporting stability. Therefore, the image reading block 4 and the operation block 16 may be more effectively suppressed from bending downward.

Figure 7:
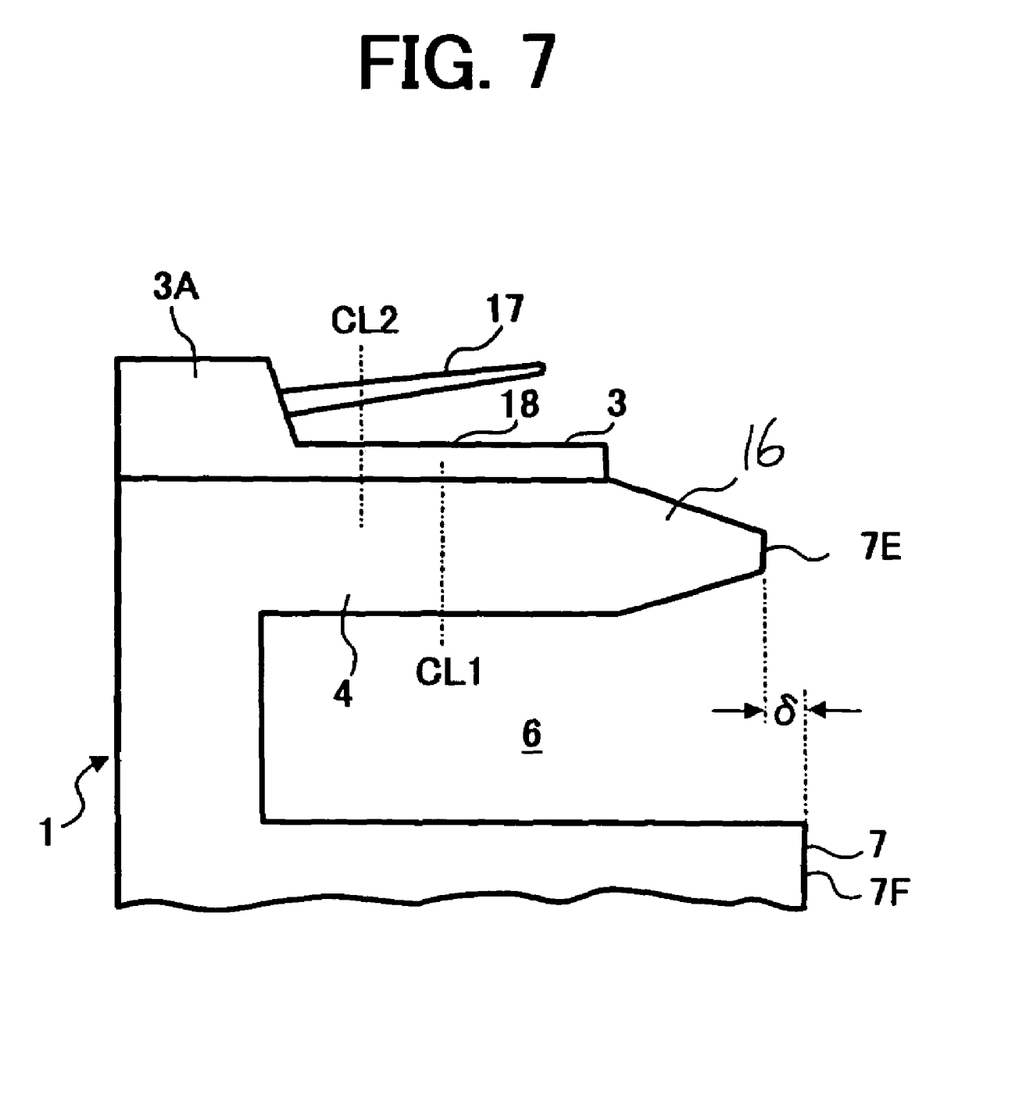
FIG. 7 is a schematic side view of the image forming apparatuses illustrated in FIGS. 5 and 6.

Turning now to FIG. 7, which is a schematic side view of the image forming apparatuses illustrated in FIGS. 5 and 6. As illustrated in FIG. 7, when the center of gravity of the image reading block 4 and the operation block 16 is at a position shifted to a rearward side from the center position (CL1) of the image reading block 4 in the front-to-rear direction of the main body housing 7, it is possible to reduce or substantially prevent the operation block 16 and the image reading block 4 from bending. Further, bending of the blocks may be prevented even when a downward load is applied to the operation block 16 without firmly supporting the operation block 16 and the image reading block 4. This configuration may be also applied to the image forming apparatuses illustrated in FIGS. 1–4.

Similarly, as illustrated in FIG. 7, when the automatic manuscript feed device 3 is mounted on the image reading block 4, if the center of gravity of the automatic manuscript feed device 3 is at a position shifted toward the rear side of the main body housing 7 from the center position (CL2) of the automatic manuscript feed device 3 in the front-to-rear direction of the main body housing 7, substantially the same effect as described above may be obtained. For example, heavy components of the automatic manuscript feed device 3 such as a motor and a substrate (not shown) may be arranged in a portion (3A) of the automatic manuscript feed device 3, so the center of overall gravity of the automatic manuscript device 3 is at the rear side. This configuration may also be applied to the image forming apparatuses illustrated in FIGS. 1–6.

In an image forming apparatus in which the automatic manuscript feed device 3 is mounted, the overall weight of the image reading block 4, the automatic manuscript feed device 3 and the operation block 16 is particularly large. Therefore, by opening or closing the automatic manuscript feed device 3, the operation block 16 and the image reading block 4 may significantly bend downward. However, by using the above-described configuration according to the embodiment of the present invention, bending of the operation block 16 and the image reading block 4 is minimized or prevented.

For a color image forming apparatus in which the image forming block 5 forms a full color image on the recording sheet (P), the height of the sheet discharge space 6 may be reduced. When the full color image is distorted, it is conspicuous. Accordingly, the present invention is especially advantageously applied to such a color image forming apparatus. However, the present invention may also be applied to a monochromatic image forming apparatus.

Numerous additional modifications and variations of the present invention are possible in light of the above teachings. It is therefore to be understood that within the scope of the appended claims, the present invention can be practiced otherwise as specifically described herein.

The present application claims priority and contains subject matter related to Japanese Patent Applications No. 2001-083807 and No. 2002-46670 filed in the Japanese Patent Office on Mar. 22, 2001 and Feb. 22, 2002, respectively, the entire contents of which are hereby incorporated herein by reference.

What is claimed is:

1. An image forming apparatus, comprising:
a scanner unit configured to scan an image;
a printer unit disposed below the scanner unit and configured to form an image on a recording medium;
an operation panel disposed above the printer unit and adjacent a front side of the image forming apparatus, the operation panel being configured to receive a command by which the image forming apparatus is operated;
a sheet discharge section disposed between the scanner unit and the printer unit, the sheet discharge section being configured to receive the recording medium including the image; and
a casing disposed adjacent a side end of the printer unit, the casing being arranged to support the operation panel within a back and forth width direction of the casing;
wherein a front side of the scanner unit is off set from a front side of the printer unit, and the scanner unit is supported by a side wall of the printer unit and forms an opening to the sheet discharge section that is open in at least two directions.

2. The image forming apparatus according to claim 1, wherein the operation panel is disposed adjacent the scanner unit.

3. The image forming apparatus according to claim 1, wherein the operation panel is connected to the scanner unit, and the operation panel is off set from the front side of the printer unit.

4. The image forming apparatus according to claim 3, wherein the operation panel is set back from the front side of the printer unit.

5. The image forming apparatus according to claim 1, wherein the scanner unit is set back from the front side of the printer unit.

6. The image forming apparatus according to claim 1, wherein the scanner unit does not extend past a plane in which the front side of the printer unit is disposed.

7. The image forming apparatus according to claim 1, wherein the front side of the scanner unit does not extend past a front side of the casing.

8. The image forming apparatus according to claim 7, wherein the front side of the casing is disposed in a same plane as the front side of the printer unit.

9. The image forming apparatus according to claim 1, further comprising:
at least one fixing roller disposed in the casing.

10. The image forming apparatus according to claim 9, wherein the least one fixing roller comprises a pair of fixing rollers.

11. The image forming apparatus according to claim 1, wherein the scanner unit forms the opening to the sheet discharge section that is open in first and second directions about perpendicular to one another.

12. The image forming apparatus as claimed in claim 1, wherein the left and right width of said scanner unit is substantially the same as that of the operation panel.

13. The image forming apparatus as claimed in claim 1, wherein the operation panel includes an operation key directly above the casing, said operation key operating the image for forming apparatus.

14. The image forming apparatus as claimed in claim 1, further comprising:
a photosensitive member configured to carry a latent image;
at least two developing devices each configured to develop the latent image in different color;
an intermediate transfer member configured to receive transfer of the developed image from the photosensitive member; and
a sheet transfer device configured to transfer the developed image onto a transfer sheet, said sheet transfer device contacting the intermediate transfer member at a prescribed transfer position;
wherein said prescribed transfer position is arranged within a left and right width portion of the casing below the casing.

15. An image forming apparatus, comprising:
means for scanning an image;
means for printing a scanned image on a recording medium, the means for printing being disposed below the means for scanning;
means for inputting a command by which the image forming apparatus is operated, the means for inputting being disposed above the means for printing and adjacent a front side of the image forming apparatus;
means for receiving the recording medium including the image, the means for receiving being disposed between the means for scanning and the means for printing; and
means for supporting the means for inputting; the means for supporting being connected to the means for printing and supporting the means for inputting the command in a back and forth width direction of the means for supporting the means for inputting;
wherein a front side of the means for scanning is off set from a front side of the means for printing, and the means for scanning is supported by a side wall of the means for printing and forms an opening to the means for receiving that is open in at least two directions.

16. The image forming apparatus according to claim 15, wherein the means for inputting is connected to the means for scanning, and the means for inputting is off set from the front side of means for printing.

17. The image forming apparatus according to claim 16, wherein the means for inputting and the means for scanning do not extend past the front side of the means for printing.

18. The image forming apparatus according to claim 15, wherein the means for scanning does not extend past the front side of the means for printing.

19. An image forming apparatus, comprising:
an image reading block configured to read an image;
an image forming block disposed below the image reading bock and being configured to form an image on a recording sheet;
an operation panel disposed above the image forming block and adjacent a front side of the image forming apparatus, the operation panel being configured to receive a command by which the image forming apparatus is operated;
a sheet discharge section disposed between the image reading block and the image forming block, the sheet discharge section being configured to receive the recording sheet including the image; and
a casing disposed adjacent a side end of the image forming block, the casing being arranged to support the operation panel within a back and forth width direction of the casing;
wherein a front side of the image reading block is set back from a front side of the image forming block, and the image reading block is supported by a side wall of the image forming block and forms an opening to the sheet discharge section that is open in at least two directions.

20. The image forming apparatus according to claim 19, further comprising:
at least one set of fixing rollers disposed in the casing.

21. The image forming apparatus according to claim 19, wherein the image reading block forms the opening to the sheet discharge section that is open in first and second directions about perpendicular to one another.

22. The image forming apparatus according to claim 19, wherein the front side of the operation panel is set back from the front side of the image forming block.

23. An image forming apparatus, comprising:
means for reading an image;
means for forming an image on a recording sheet, the means for forming being disposed below the means for reading;
means for inputting a command for operating the image forming apparatus, the means for inputting being disposed above the means for forming and adjacent a front side of the image forming apparatus;
means for receiving the recording sheet on which the image is formed, the means for receiving being disposed between the means for reading and the means for forming; and
means for supporting the means for inputting in a back and forth width direction of the means for supporting the means for inputting,
wherein a front side of the means for reading is set back from a front side of the means for forming an image, and the means for reading is supported by a side wall of the means for forming and forms an opening to the means for receiving that is open in at least two directions.

24. The image forming apparatus according to claim 23, further comprising:
means for fixing the image formed on the recording sheet.

25. The image forming apparatus according to claim 23, wherein the means for forming forms the opening to the means for receiving that is open in first and second directions about perpendicular to one another.

26. The image forming apparatus according to claim 23, wherein the front side of the means for inputting is set back from the front side of the means for forming an image.

* * * * *